INVENTORS:
Carl O. Carlson
David A. Grafton
David B. Congleton
By Louis A. Kline
John J. Matlago
Mervyn L. Young
Their Attorneys.

May 25, 1965 C. O. CARLSON ETAL 3,185,026
METHOD AND APPARATUS EMPLOYING METACHROMATIC MATERIAL
FOR FORMING A PLURALITY OF INDIVIDUAL MICRO-IMAGES
Filed May 22, 1961 4 Sheets-Sheet 2

INVENTORS
Carl O. Carlson
David A. Grafton
David B. Congleton
Louis A. Kline
By John J. Matlago
Murray L. Young
Their Attorneys INVENTORS:
Carl O. Carlson
David A. Grafton
David B. Congleton
By Louis A. Kline
John J. Matlago
Murray L. Young
Their Attorneys INVENTORS:
Carl O. Carlson
David A. Grafton
David B. Congleton
By Louis A. Kline
John J. Matlago
Their Attorneys.

3,185,026

METHOD AND APPARATUS EMPLOYING METACHROMATIC MATERIAL FOR FORMING A PLURALITY OF INDIVIDUAL MICRO-IMAGES

Carl O. Carlson, Los Angeles, David B. Congleton, Manhattan Beach, and David A. Grafton, Santa Monica, Calif., assignors to The National Cash Register Company, Dayton, Ohio, a corporation of Maryland Filed May 22, 1961, Ser. No. 111,759
16 Claims. (Cl. 88—24)

This invention relates to optical information storage apparatus and procedures and more particularly to apparatus and systems for the storage and retrieval of optical information in the form of micro-images.

Of concern to any corporation, government agency, library, or any other organization is the problem of storage of records and documents of various sorts. With increases in the volume of such records and documents there is a resulting increase in the amount of storage space required as well as an increase in the time required to locate and retrieve a document once it has been stored. In recent years, documents have been photographed and stored on now well-known microfilm where the reduction of the document size has been of the order of 20 to 1 and the film is then stored on reels which must be reviewed in a serial fashion to locate a given document. While microfilm storage has reduced the amount of storage space that would otherwise be required, it has not completely resolved the problem of storage requirements for the increasing amount of records encountered in every day business and more importantly, it has not reduced the storage requirements to a point where document retrieval can be easily mechanized. Furthermore, microfilm storage has an inherent disadvantage in regard to record storage and processing in that once the original document has been placed on the microfilm, it cannot be updated and the introduction of new information to the record can be achieved only by the formation of a new document which in turn must be photographed and reduced to microfilm.

It is a major object of this invention to provide an improved information storage and processing system.

Another object of this invention is the provision of improved apparatus for mechanized supply and retrieval of information from an optical information storage system.

It is still another object of this invention to provide an improved optical information storage apparatus wherein the information may be updated or processed within the storage system.

In the copending application of Carl O. Carlson, filed October 12, 1959, Serial No. 845,781, now U.S. Patent No. 3,085,469, issued April 16, 1963, there is disclosed a spatial filter apparatus whereby an information-containing beam of light is transmitted through a photo-metachromatic film the point to point transmissivity of which may be varied in response to exposure to light of a variety of particular wave lengths. This photo-metachromatic material is composed of light-sensitive dyes which become opaque, in response to ultraviolet light, to filter out portions of the information-containing light beam. Moreover, this opaque condition can be "erased" upon exposure to light of particular frequencies in the optical portion of the spectrum depending upon the particular dyes employed. The capability of the photo-metachromatic film to change its state in response to light and to reverse its change of state makes it particularly adaptable for record or document processing wherein the photo-metachromatic film can be exposed to light of a particular frequency to form opaque portions representing the image of the document and selected portions of the image may be "erased" by exposure to light of a different frequency. More importantly, the change of state occurs at a molecular level such that the photo-metachromatic film has very high resolution characteristics and is capable of receiving images which have been reduced in size by a factor of greater than 200 to 1 (corresponding to an areal reduction of 40,000 to 1).

A major feature of the present invention resides in a system including a high resolution metachromatic memory plate containing light sensitive dyes and capable of receiving a plurality of substantially reduced images. Formation of the respective images on the memory plate is obtained in response to light containing frequencies in the blue-ultraviolet portion of the electromagnetic spectrum, and quenching or "erasing" any selected image is obtained in response to light of sufficient intensity which light does not contain frequencies in the blue-ultraviolet portion of the spectrum. To provide for selection of a particular image for either erasure or readout, a second feature of this invention resides in a mechanism for randomly accessing and retrieving the selected image. Such an optical information storage system possesses practical time requirements for storage and retrieval of information and also allows for updating and processing of information in a given document without employing undesirable photographic developing or processing techniques.

Other objects, advantages, and features of the present invention will become apparent from consideration of the following description when taken in conjunction with the appended claims and the drawings wherein:

FIG. 1*a* is a pictorial view of the preferred embodiment of the present invention;

FIG. 1*b* is an enlarged sectional view of the memory plate showing the relative positions of the respective stored images;

Figures 1A, 1B:
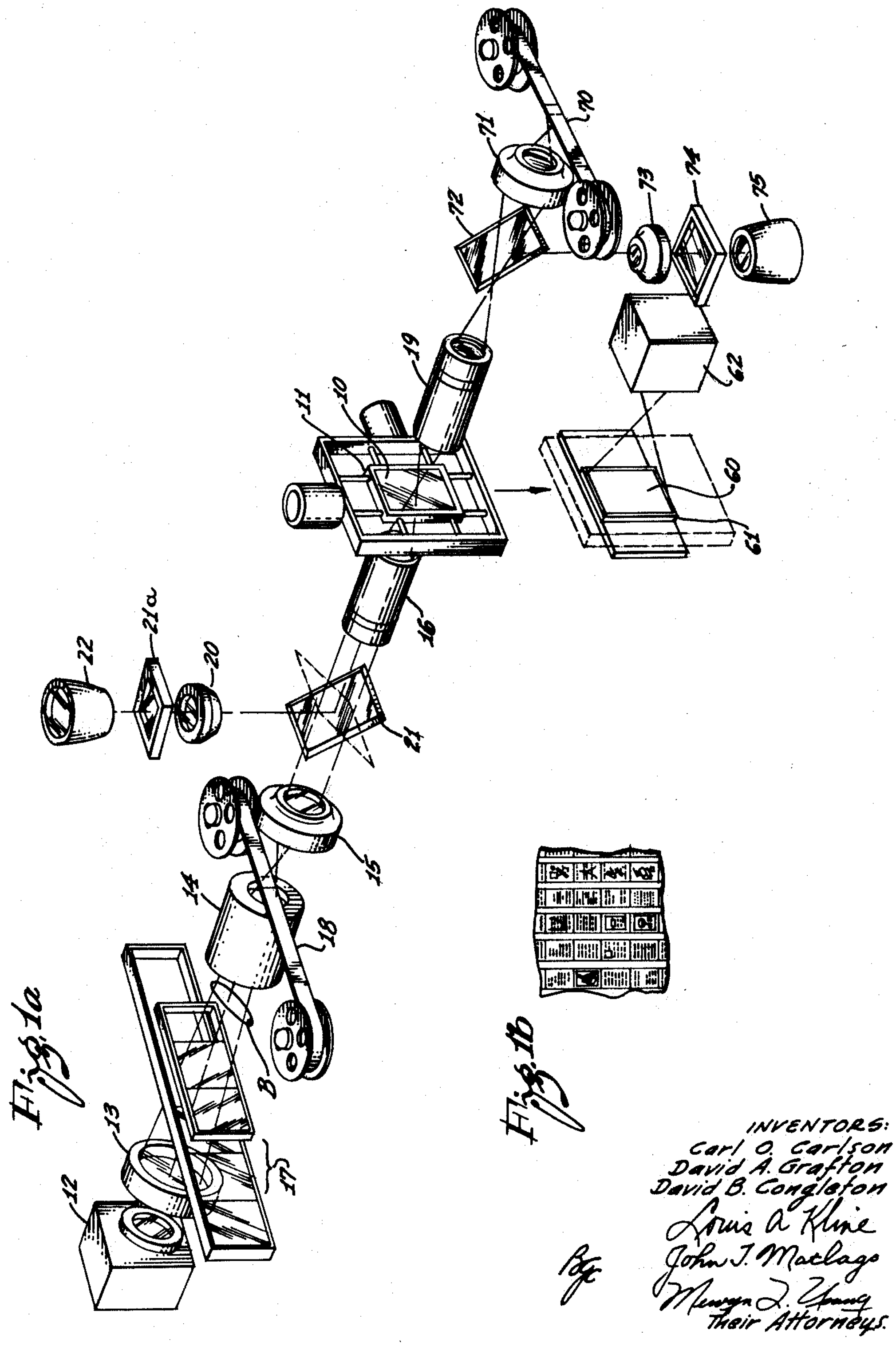

As employed in this disclosure, the term micro-image refers to an image reduced by a factor of greater than 100 to 1 and the term photo-metachromatic material refers to a translucent or transparent material containing a molecular dispersion of reversible light sensitive dyes which become opaque or exposure to radiation in the blue-ultraviolet portion of the electromagnetic spectrum. The material is of the type wherein the opaque condition can be quenched or erased either by natural reversal or by a reversal induced by applied energy such as heat and/or light. Such a photo-metachromatic material can be made to retain two dimensional patterns that are optically transferred to the material surface which exhibits excellent resolution capabilities. Furthermore, both positive-negative and direct positive transfers are possible.

In addition to possessing excellent resolution capabilities, photo-metachromic materials do not require the formation of a latent image. Thus, the materials can be observed and inspected while the image is being formed and no photographic development processes are required to fix the image. The image appears in the material as the individual molecules change to an excited state in response to the exciting radiation, that is, from the visible light transmitting state to the visible light absorbing or colored state (the reverse situation may be obtained by proper choice of the spectral distributon of exciting radiation).

Photo-metachromic coatings may be of the type which are relatively insensitive to an erasure by visible light but but are heat-erasable. Coatings erasable by visible radiation also are erasable by heat. Since the spectral region (red-green) used to read out (or display) a stored image is also used for erasing the light erasable coatings, readout tends to erase the recorded image. However, because of the low photo sensitivities of metachromatic materials, relatively high intensity light sources are required for reasonably fast erasing exposures and lower intensity light sources can be used to project an image thus stored without undue quenching of the image. Thus, by taking into account the energies involved, a system can be designed to permit thousands of readouts before severe loss of contrast in the image occurs. Furthermore, the metachromic material can be reversibly switched between the transmitting and absorbing states at least 1000 times before material fatigue begins to set in.

Metachromic materials include, for example, elementary and complex spiropyrans and derivatives thereof. As a typical specific example of metrachromatic material, a film may be formed by solidification of a poured mixture of the following, the proportions being in terms of parts by weight:

| | |
|---|---|
| Eastman "Half-second Butyrate" #EAB-381 | 25.0 |
| Chlorinated diphenyl having 60% by weight of chlorine | 25.0 |
| Toluene | 28.0 |
| Methyl ethyl ketone | 22.0 |
| Ethanol (95%) | 5.4 |
| Butanol | 0.6 |
| 6'-nitro-8'-methoxy-1,3,3-trimethylindolinobenzopyrylospiran | 0.375 |

Further information on the "Half-second Butyrate" may be obtained from a publication bearing this title and copyrighted in 1955 by the Tennessee Eastman Company. This film is mounted between thin quartz-glass sheets to form a "slide." This slide also may be a transparent plastic coating on a suitable transparent substrate. The film, thus described, exhibits high absorbency in both excited and unexcited states to excitation in the ultra-violet region of the spectrum; but low absorbency unexcited and high absorbency excited, in the waveband 500 to 600 m$\mu$; the ambient temperature preferably being about −40 degrees centigrade for an extended long term decay time and the excitant being ultraviolet radiation. Other examples of metachromatic means are discussed in the above-mentioned Carlson application, Serial No. 845,781 now U.S. patent No. 3,085,469, issued Apr. 16, 1963. From the variety of materials therein disclosed, there may be selected specific materials which are characterized by particular decay rates and capabilities of being excited by radiation of particular frequencies for applications to a variety of situations or conditions.

Since the high resolution capabilities of a photo-metachromatic film allow for extremely high reduction of images placed on the film (the only practical limitation upon the amount of demagnification lies in the optical system being utilized), such a film becomes an ideal medium for the storage of micro-images. To this end, there is shown in FIG. 1*a* a preferred embodiment of a micro-image memory utilizing metachromatic means 10 in the form of a flat plate mounted in positioning frame 11. To change the state of a particular portion of the metachromatic plate 10, there is provided light source 12 which produces and directs light beam B through a condensing system formed of lenses 13 and 14, through shutter 15 to writing lens 16. Object means 18 such as a transparent copy of a document or record is placed in the light beam between lens 14 and shutter 15 and writing lens 16 is adjusted to project a substantially reduced image of the document onto the plane of metachromatic plate 10 and at the particular portion of plate 10 in the path of this imaging beam.

While various forms of the document may be utilized to introduce information into the light beam B, the document is preferably reduced to a transparent microfilm as shown in FIG. 1*a*. It is preferable that the document be in the form of a transparency and conventional microfilm is convenient for this purpose. Various optical systems are available, however, for reduction of image size by a factor of greater than 200 to 1 and it is not necessary to go through the two step reduction of the preferred embodiment, that is, reduction of the document to micro-film with further reduction to metachromatic plate 10. The use of transparencies in this fashion also may be readily utilized for correcting an image which has already been formed on metachromatic plate 10.

After an image has been formed on metachromatic plate 10, the plate is moved to a new position as will be described later and a new image may be formed of a new document and the plate is then again moved to a new position and so on. When it is desired to erase a particular image, the metachromatic plate 10 is positioned so that the selected image is in the path of light beam B and the plate is exposed to light of the particular waveband for "erasing" depending upon the particular photometachromatic material. To form a light beam of the required frequencies for both "erasing" and also for "writing" the initial image, filter system 17 is inserted in light beam B between the respective converging lenses 13 and 14. While various filter systems may be employed, the preferred embodiment consists of two series of filters which may be moved into or out of the light beam B so as to provide, for example, ultraviolet light for the formation of an image, the particular waveband for "erasing" and also to provide appropriate light of low intensity for readout which will be described later. In the case of both "writing" and "erasing," shutter 15 is employed to control the exposure time which may vary for different photo-metachromatic materials.

Since the images formed in metachromatic plate 10 are substantially reduced to a size the order of magnitude of which is approximately ten mils, it becomes important to insure a dust free environment for plate 10. Thus plate 10, positioning frame 11 and lens systems 16 and 19 are retained in a dust free chamber (not shown) the atmosphere of which is carefully controlled. A particular advantage of this arrangement is that the temperature within the chamber can be maintained at the particular values required to reduce the natural decay or reversal which is characteristic of the photo-metachromatic material. A second advantage of this arrangement is the reduction of error caused by expansion and contraction of the respective lens systems.

When it is desired to update a given document in metachromatic memory 10, the respective image is positioned in light beam B and an appropriate masking transparency is employed as object means 18. Filter system 17 is adjusted to provide light not containing frequencies in the blue-ultraviolet portion of the spectrum as required for erasing; and the image is exposed to this erasing light. The particular information to be inserted is then reduced to transparent microfilm and positioned as object means 18 and filter system 17 is adjusted to provide ultraviolet light.

When it is desired to read out information retained in the metachromatic memory plate 10, filter system 17 is arranged to provide light that does not contain frequencies in the ultraviolet portion of the spectrum and that is of an intensity sufficiently low as to not readily affect the metachromatic plate 10. An appropriate readout lens 19 is positioned in light beam B on the opposite side of the metachromatic plate 10 from light source 12 to focus an appropriate readout image at image plane 70 which may be a viewing screen, or as shown in FIG. 1*a*, unexposed micro-film. Various other forms of readout may be employed. However, a particularly useful readout system may be obtained, as shown in FIG. 1*a*, where beam splitter 72 is inserted in the path of the readout beam to deflect the image through shutter 73 and filter 74 to lens 75 attached to a camera that is part of a closed circuit television system for remote viewing.

One of the advantages of the photo-metachromatic material is that it does not require any chemical developing processes, and thus, the material may be viewed while an image is being formed thereon. To this end, beam splitter 21 is placed in the path of light beam B between writing lens 16 and shutter 15 to reflect the image formed at metachromatic plate 10 upwardly through shutter 20 and filter **21*a* toward a viewing eye piece 22. Thus, metachromatic plate 10 may be inspected to see whether the proper image has been appropriately positioned and this image may also be inspected for any correction that may be required. The image formed at metachromatic plate 10 can also be compared with the transparency of the original document and to this end beam splitter 21** is mounted for rotation (as indicated in FIG. 1*a*) so as to reflect the image on the transparency upwardly toward viewing piece 22. The image being formed at metachromatic plate 10 is now viewed through viewing eye piece 75 and through viewing eyepiece 22 for manual comparison between the transparency and the newly formed image. Shutters 20 and 73 and filters **21*a* and 74 are provided to protect the viewer from the ultraviolet radiation employed to form the image at plate 10**.

Figure 4:
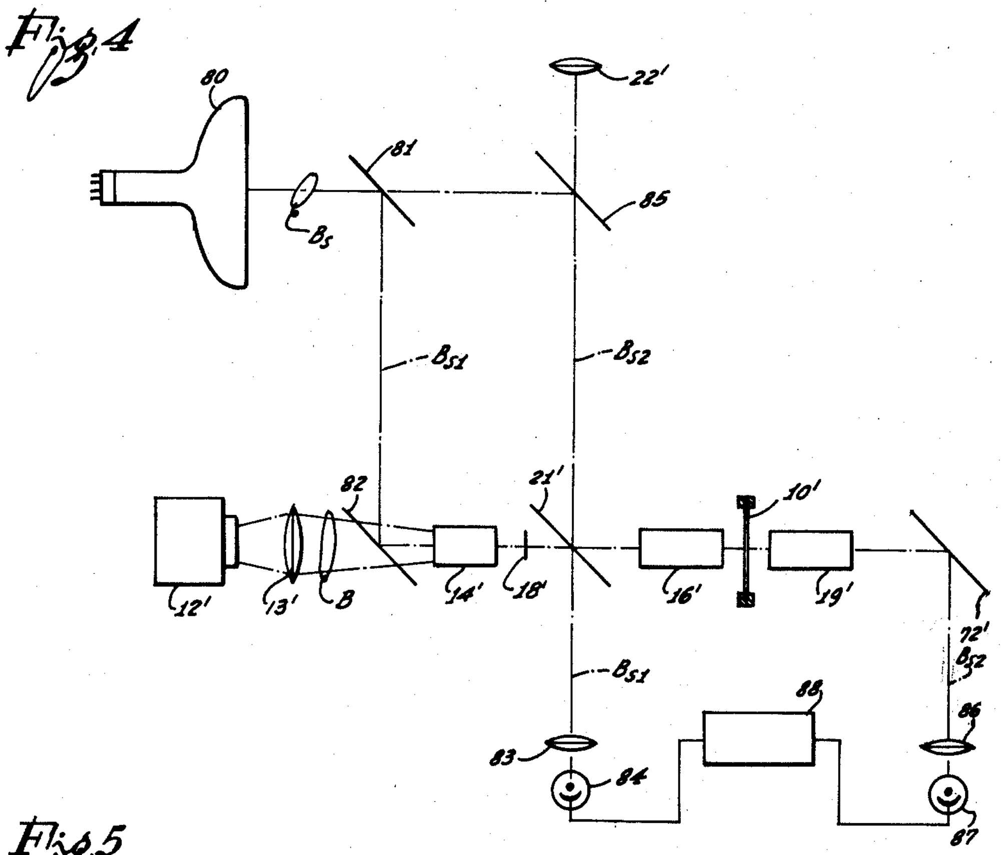
FIG. 4 is a schematic diagram of a preferred image inspection system.

Comparison between the transparency and the image being formed at plate 10 can also be obtained automatically by variouns scanning systems. Referring to FIG. 4 there is shown a schematic diagram of a preferred scanning system for a storage system similar to that shown in FIG. 1*a* and including light source 12′, converging lenses 13′ and 14′, writing lens 16′, metachromatic plate 10′ and projection lens 19′. This system employs a raster in the form of cathode ray tube 80 to produce scanning beam $B_s$ directed towad beam splitter 81 where a portion thereof, beam $B_{s1}$, is reflected toward beam splitter 82 and through lens system 14′ to object 18′ which is a transparency of the document being stored. As scanning beam $B_{s1}$ traverses the face of the transparency, the light transmitted therethrough is received and reflected downwardly by beam splitter 21′ through converging lens 83 to photo detector 84. Similarly, the remaining portion, $B_{s2}$, of scanning beam $B_s$, is transmitted through beam splitter 81 to beam splitter 85 for reflection downwardly to beam splitter 21′ and through writing lens 16′ to the image formed on metachromatic plate 10′. As scanning beam $B_{s2}$ traverses the face of plate 10′, the light transmitted therethrough is received and reflected downwardly by beam splitter 72′ through converging lens 86 to photo detector 87. The output signals of photo detectors 84 and 87 are supplied to a conventional comparator circuit 88 for detection of any differences between the respective output signals. Since beams $B_{s1}$ and $B_{s2}$ are derived from the same source and scan with similar patterns, any difference between the output signals of photo detectors 84 and 87 will indicate an unacceptable image on metachromatic plate 10′. The image may be unacceptable due to a dust particle on the face of plate 10′ or due to insufficient exposure of plate 10′ to light beam B which contains the image of the document in transparency 18′. When such an unacceptable image is detected, it may be erased and rewritten, or if the system is automated as will be described later, the transport mechanism for plate 10′ is directed to move plate 10′ to the next image position and the document image is again transferred to plate 10′.

Because of the high resolution characteristic of the photo-metachromatic material which is greater than 1000 lines per millimeter, memory plate 10 can easily receive a reduced image of an 8½″ by 11″ document at a reduction of 200 to 1. At such a reduction, 100,000 such documents can be stored on a memory plate which is approximately 15½ inches square. To illustrate the relationship between the image positions in memory plate 10, an enlarged plan view of a section of the memory plate is shown in FIG. 1*b*. At a reduction of 200 to 1, the actual image size of each document is approximately 0.06″ by 0.04″. Because of this high density storage, memory plate 10 requires only small movement for repositioning which is ideal for mechanization of the system for rapid retrieval of stored information.

Figure 2:
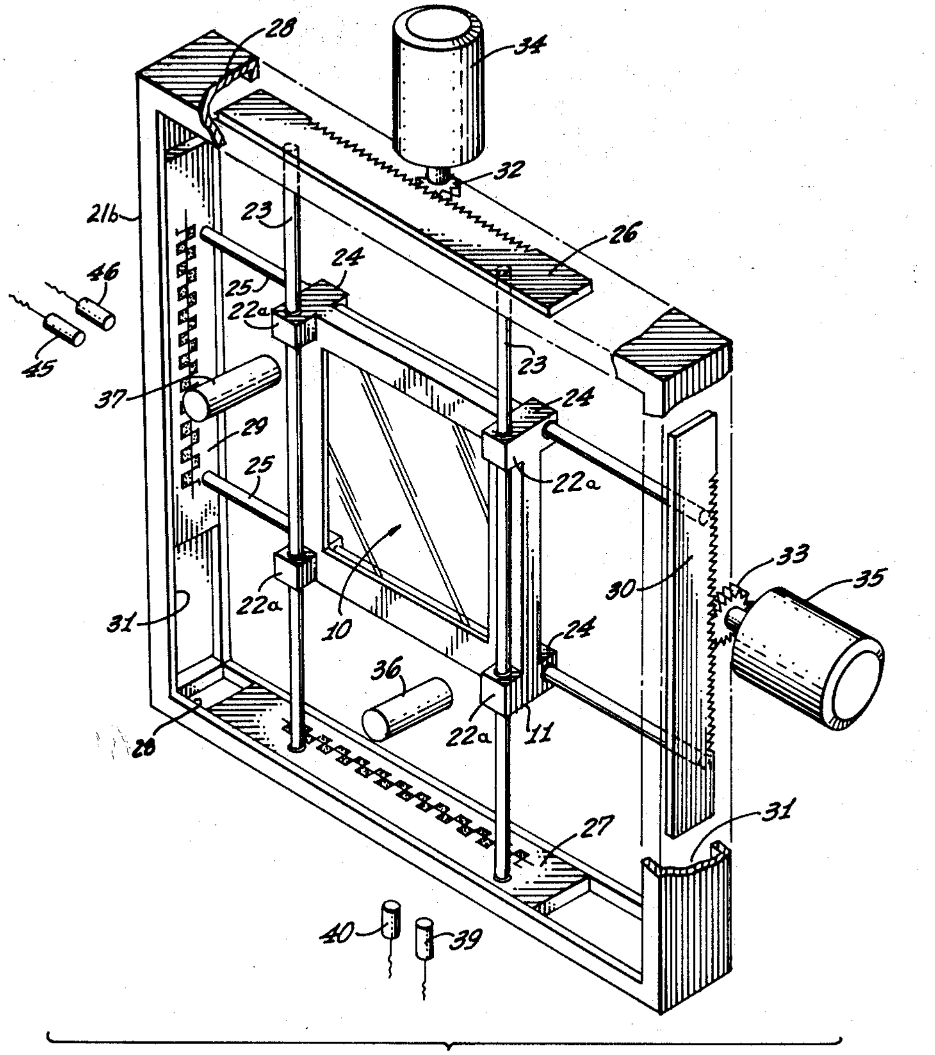
FIG. 2 is a perspective view of the working memory plate and the respective positioning servomotors.

Referring now to FIG. 2 there is shown the mechanism for the two dimensional positioning of metachromatic plate 10 which is mounted in positioning frame 11. Frame 11, which is rectangular in shape, is provided with two sets of four flanges that are perpendicular to the face of the frame and are adapted to receive vertical and parallel guide rods. Thus, flanges **22*a* slidably receive vertical guide rods 23 for support against horizontal movement and flanges 24 slidably receive horizontal guide rods 25 for support against vertical movement. Vertical guide rods 23 in turn have their top and bottom ends respectively mounted for spaced alignment in positioning bars 26 and 27 that slidably engage horizontal slots 28 of mounting frame 21. Similarly, horizontal guide rods 25 have their corresponding ends respectively mounted in vertical positioning bars 29 and 30 that slidably engage vertical slots 31 of mounting frame 21*b*. Metachromatic plate 10, then, is mounted for vertical and horizontal movement and to facilitate such movement and yet guarantee accurate positioning, horizontal mounting bar 26 and vertical mounting bar 30 are provided with toothed edges to form racks which respectively engage spur gears 32 and 33 that in turn are respectively driven by stepping motors 34 and 35 attached to frame 21*b***.

Stepping motors 34 and 35 may be of the type commercially available and capable of 500 steps per second with the spur gear rotating through 3½ degrees per step such that the incremental change of position of the respective mounting bars is 30 mils per step. Each stepping motor is driven by clock pulses gated from a comparator to the respective motor drivers as will be described later. The stepping rates, as described above for each motor, then depend entirely on the clock pulse rate and the incremental angular displacement of the respective motor shafts in dependence on the number of pulses being gated into the drivers.

Since memory plate 10 may be moved in both horizontal and vertical directions, each image position in the plate will require two addresses to locate that particular image position. The respective addresses will hereafter be referred to as X and Y addresses respectively corresponding to the horizontal and vertical position of the image.

To locate the respective positions, a photo diode feed back system may be employed in conjunction with transparent X and Y code plates respectively contained in horizontal mounting bar 27 and vertical mounting bar 29. As shown in FIG. 2, the photo diode feed back system employs light source 36 to direct a light beam onto and through the X code plate and an appropriate aperture therebeneath toward two photo diodes, 39 and 40, positioned on the other side of the plate to pick up the light signal. The code plate has two independent channels containing equally spaced opaque and non opaque blocks the length of which corresponds to the width of the image position in metachromatic plate 10. The two channels are positioned out of phase with each other, that is, each opaque block in one channel is aligned with a non opaque block in the other channel and each of the photo diodes 39 and 40 is positioned to receive light transmitted through the respective channels. While only one channel of coded opaque blocks is required, the dual channel arrangement is advantageous when it is desired to incorporate a count checking means into the retrieval system.

Figure 3:
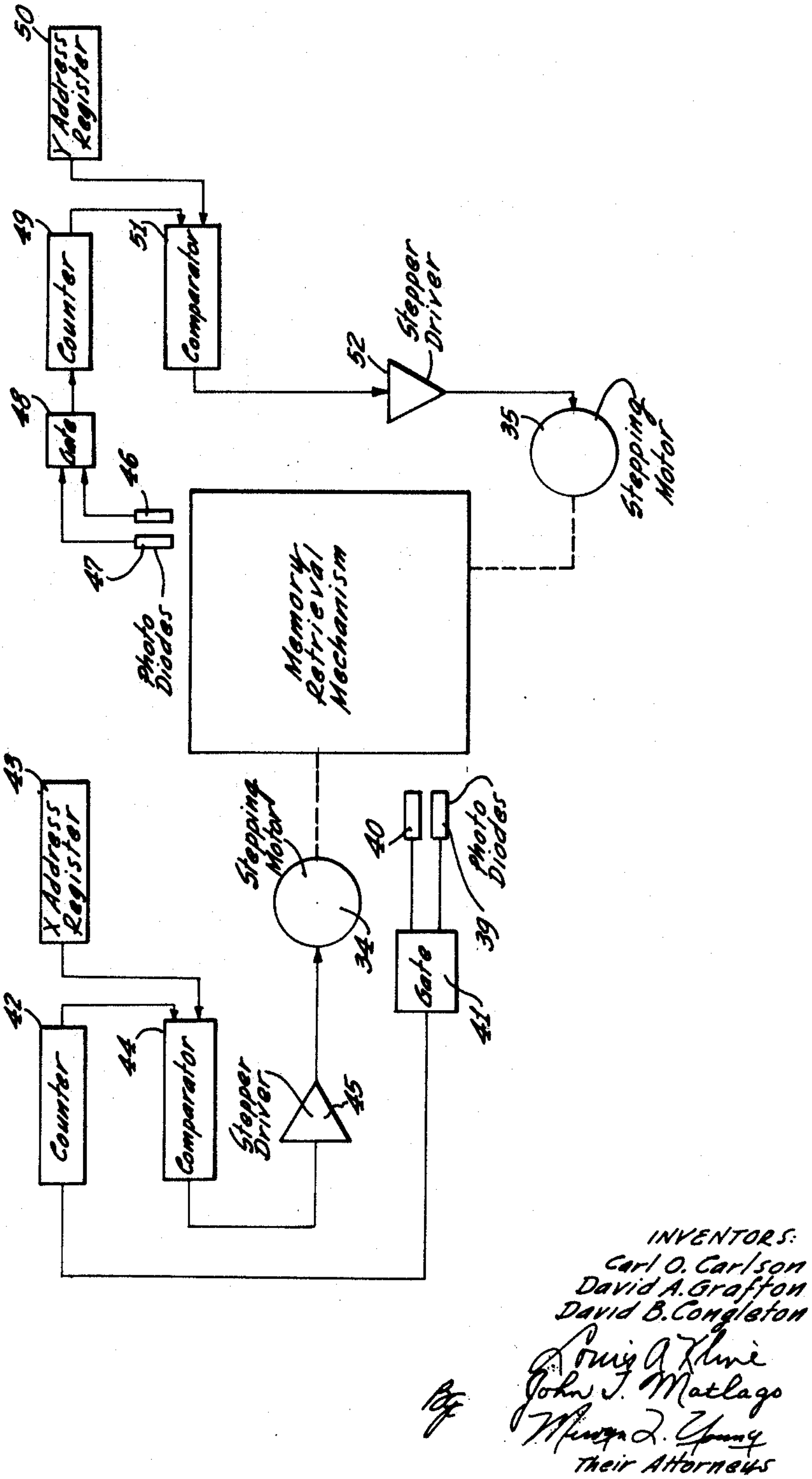
FIG. 3 is a schematic diagram of the memory retrieval mechanism.

Referring now to FIG. 3, there is shown a schematic diagram of the retrieval system wherein the output leads of the photo diodes 39 and 40 are connected through an "or" gate 41 to binary counter 42 the output of which is supplied to comparator 44 which also receives information in the form of electrical pulses from the X register 43 that is supplied with the X address. The comparator output is a function of the difference between the address recorded in binary form in address register 43 and the binary counter information obtained from photo diodes 39 and 40. When the binary number in the address register is greater than the binary number in the counter, the comparator gates a positive going pulse along its output lead to stepper driver circuit 45 which in turn drives stepping motor 34 in a clockwise direction. When the binary number in the address register is less than the binary number in the counter, the comparator gates a negative going pulse to the stepping motor driver 45 which drives the stepping motor 34 in a counterclockwise direction. When the numbers in the address register in the counter are equal, no pulse is delivered to the stepping motor driver 45 and the shaft of stepping motor 34 is locked in position. Similar circuitry is provided for the Y position address wherein photo diodes 46 and 47 receives light that is directed through code plate 29 from source 37. (See FIG. 2). Output signals, from photo diodes 46 and 47, are supplied to "or" gate 48 the output of which is supplied to binary counter 49. Y register 50 is provided to supply signals representing the Y address to comparator circuit 51 which also receives the output signals from binary counter 49. The output signals from comparator 51 are supplied to stepper driver circuit 52 that in turn drives stepping motor 35 in a manner similar to that described for stepping motor 34. Thus, when the respective X and Y registers receive particular addresses corresponding to the given image field in metachromatic plate 10, the respective stepping motors 34 and 35 will be activated to position metachromatic plate 10 accordingly. It will be noted that the X and Y transport mechanisms are separate from one another and are individually controlled by the circuitry shown in FIG. 3. Any conventional means may be employed to supply address signals to the respective registers 43 and 50 such as a manual keyboard or other information input devices or the address registers may receive their input signals from a selective computer system for many different purposes as will be described later.

Exemplary writing and reading times for an individual image stored in the system described herein are as follows: writing (exposure of the metachromatic material), 0.5 second; readout (exposure of micro-film), 0.01 second. Maximum positioning time for one image retrieval is 0.6 second.

Figure 5:
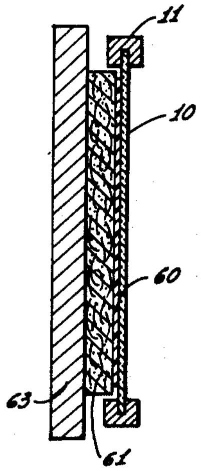
FIG. 5 is a cross-sectional view of the bulk transfer mechanism.

As described thus far, the storage system and apparatus contained therein is utilized to store micro-images of a large number of documents and records any or all of which may be updated in the memory system as required. In this sense, the metachromatic memory plate 10 is a "working" memory and from time to time, it may be required to make a permanent record of the information stored therein. As indicated in FIG. 1*a*, a permanent record may be accomplished by removing metachromatic plate 10 and its positioning frame 11 from the path of light beam B to a position where any conventional non-reversible film can be placed in contact with the metachromatic plate 10 for exposure by various contact printing means. Photographic film 60 is mounted on a non-rigid support 61 which is preferably of a felt material to insure an evenly distributed pressure over film 60 when in contact with metachromatic plate 10 as shown in FIG. 5. Pressure plate 63, to which film support 61 is attached, may be a part of any conventional mechanism for clamping film 60 in contact with plate 10. Light source 62 is preferably of the type employed in conventional photographic enlargers, and should be placed at an optimum distance from the film as to be semi-specular and not present interference patterns or overly diffuse images in the plane of the photographic film. The intensity and frequencies emitted from light source 62 as well as the exposure time are chosen according to the characteristics of film 60; however, care should be taken that such frequencies and intensities are not of the type sufficient to "erase" or quench the images stored in metachromatic plate 10.

After the contact printing, film 60 can then be developed by conventional photographic processess and placed in a permanent storage file. One particular application of this type of bulk transfer of information stored in the metachromatic film is that updating of documents stored in the "working" memory may be carried on continuously while permanent copies of the stored information can be periodically made in bulk and used in appropriate readout devices supplied to sub stations. For example, inventories may be continuously updated with copies supplied to branch stores of a large retail chain.

With the system thus described, mechanization of optical information storage and retrieval can be readily accomplished. This system may be combined with other data processing equipment to achieve further mechanization. For example, when a particular document is stored in the metachromatic memory, it may be coded as to its contents and this information, together with the X and Y addresses of the storage position of the document image, is then transferred to punched cards or punched tape or other input devices for a standard electronic computer system. When particular types of information are desired this index may be searched for the particular code describing relevant documents, and the respective addresses are thus obtained and supplied to the information retrieval system described above to locate the images which are in turn read out of the system. With this system, remote viewing of stored information can be achieved by employing a closed circuit television system wherein the viewer "requests" the desired information of the information retrieval mechanism which information is then displaced at the viewer's receiving set.

The variety of applications of the system described herein result from the unique properties of the reversible light sensitive dyes uniformly dispersed throughout the metachromatic material. Since metachromatic materials are erasable, it now becomes possible to build a large optical information storage unit wherein any error in the input of information can be readily corrected and thus it is not necessary to discard the storage plate because of faulty images as must be done with conventional photographic storage systems. Furthermore, since metachromatic materials do not require the formation of a latent image, the storage plate can be inspected while the image is being formed and this inspection step can be easily mechanized. More importantly, it is not required that the storage plate be subjected to any photographic developing process before any or all of the stored images can be accessed and their information retrieved.

Because of the extremely high resolution capabilities of metachromatic films, great image reduction allows for very high density storage (image reduction of 200 to 1 as mentioned herein is merely for practical consideration and image reductions by a factor of 300–400 to 1 are easily obtainable) and it is because of this feature that a random access document storage can be mechanized in the manner of the present invention.

Variations in the applications thus far suggested can be made for a variety of applications of the system described herein. Having disclosed an exemplary embodiment of the system utilizing the principles of the invention and exemplary procedures according to the invention, it is evident that changes and modifications will occur to those skilled in the art; and accordingly it is not desired to be limited to the exemplary apparatus or procedures described.

What is claimed is:

1. An optical system for forming micro-images on photographic film comprising: light source means for providing a beam of light including frequencies within a first waveband, said beam containing an image of an object which is to be formed into a micro-image; storage micro-image means disposed normal to and in the path of said beam and including reversible metachromatic material in which images may be formed in response to light of frequencies within said first waveband, said reversible metachromatic material being selectively excitable to a relatively opaque state upon exposure to said beam of frequencies without requiring the formation of a latent image; imaging means disposed between said light source means and said metachromatic means for receiving said beam of light and projecting a micro-image of said object onto the metachromatic material; accessing means to selectively position said metachromatic material within said beam of light; said light source means including means to provide a second beam of light containing frequencies not within said first waveband for the quenching of said image; said light source means also including means to provide a third beam of light capable of transmitting the micro-image formed on said metachromatic material while the micro-image thereon remains substantially unaffected; and photographic film receiving means onto which the micro-image is transferred by said third beam.

2. An optical system according to claim 1 including means for visual inspection of said metachromatic material simultaneously with the formation of the image thereon.

3. An optical system according to claim 1 including means for comparing the micro-image formed on said metachromatic material with the object from which it is formed.

4. An optical system for forming a plurality of individual micro-images on photographic film comprising: a beam of light including frequencies within a first waveband, means for successively introducing individual objects into said beam of light; micro-image storage means including a plane configuration of reversible metachromatic material disposed normally to and in the path of said beam, said metachromatic material being selectively excitable to an opaque state upon exposure to light of frequencies within said first waveband without requiring the formation of a latent image; imaging means disposed in the path of said light beam between said light source means and said storage means and including image reduction means for receiving said beam and projecting a micro-image of each of said objects onto the metachromatic material at a selected position; accessing means to selectively position said metachromatic material for receiving each micro-image at a selected position; said light source means including means to provide a beam of light containing frequencies not within said first waveband for the quenching of at least one of said images, said light source means also including means to provide a third beam of light capable of transmitting in bulk the micro-images formed on said metachromatic material while the micro-images thereon remain substantially unaffected; and photographic film receiving means onto which the micro-images are transferred by said third beam.

5. An optical system according to claim 4 wherein said accessing means includes first and second motive means adapted to selectively position said metachromatic material in a two dimensional plane normal to said beam of light in response to electrical signals corresponding to the selected position; and means to generate and supply the electrical signals to said motive means.

6. An optical system according to claim 5 wherein the signal generating means includes first and second address registers; and first and second electrical detector systems to supply signals corresponding to the current position of said metachromatic material; said detector systems and said address registers being adapted and arranged to supply respective first and second signals to the respective first and second motive means in response to comparison between respective signals received from said first and second detector systems and signals received from said first and second registers.

7. An optical system for forming a plurality of individual micro-images on photographic film comprising: light source means for providing a beam of light containing frequencies within a first waveband; storage means including a plane configuration of transparent metachromatic material disposed normally to and in the path of said beam; object transparency means disposed in the path of said beam between said light source and said metachromatic material to impart in sequence individual objects into said beam of light; imaging means disposed in the path of said light beam between said object means and said metachromatic material to project an image of each object onto a selected portion of said metachromatic material; said metachromatic material containing a molecular dispersion of reversible light sensitive dyes which become opaque on exposure to frequencies within said first waveband without requiring the formation of a latent image; means to inspect said metachromatic material simultaneously with the formation of each micro-image thereon; means for providing a second beam of light not within said first waveband for transmitting in bulk the images formed on said metachromatic material without affecting the micro-images thereon; and photographic film receiving means onto which each micro-image can be transmitted by said second beam.

8. An optical system according to claim 7 wherein said inspection means includes optical means for visual comparison of each image on said metachromatic material with its respective object.

9. An optical system according to claim 7 wherein said inspection means includes: a scanning means to generate a first scanning beam of light and a second scanning beam of light; first optical means to receive and direct said first scanning beam of light onto and through said object means; second optical means to receive and direct said second scanning beam of light onto and through said metachromatic material; and photo-detector means to receive said first and said second scanning beam of light for comparison thereof.

10. An optical system for forming micro-images and for displaying selected ones thereof comprising: light source means for providing a beam of light of frequencies within a first waveband; means for sequentially introducing individual objects into said beam; micro-image storage means including a plane configuration of metachromatic material disposed normally to and in the path of said beam, said metachromatic material containing a molecular dispersion of reversible light sensitive dyes which become opaque on exposure to light within said first waveband without requiring the formation of a latent image; imaging means disposed between said light source means and said metachromatic material for receiving said beam and projecting a substantially reduced micro-image of each object onto the metachromatic material at a selected position; accessing means to selectively position said metachromatic material in a plane normal to said beam of light; and display means aligned to receive light transmitted through said metachromatic material and including projection means for forming an enlarged image of a selected one of said micro-images; and said light source means including means to provide a second beam of light containing frequencies not within said first waveband for the selective display of each micro-image on said metachromatic material without affecting the image displayed; said light source also including means to provide a third beam of light for selectively erasing micro-images from said metachromatic material.

11. An optical system according to claim 10 and including a viewing screen in the plane of said enlarged image.

12. An optical storage system according to claim 10 including photographic means for receiving and transferring said enlarged image to photographic film.

13. An optical information system according to claim 10 including bulk transfer means for the optical transfer of a plurality of images formed within said metachromatic material to photographic film.

14. An optical system for forming micro-images comprising: light source means for providing a beam of light including frequencies within a predetermined waveband, a plane configuration of high resolution metachromatic material which is selectively excitable to manifest an image thereon upon exposure to light of frequencies within said predetermined waveband without requiring the formation of a latent image, means for introducing objects one at a time into said beam of light, means including image reducing means cooperating with said beam of light so as to form a high resolution micro-image in the plane of said metachromatic material of an object introduced into said beam, means for forming a high resolution micro-image of each object as it is introduced into said beam at a different location on said metachromatic material and means for inspecting a micro-image formed on said metachromatic material.

15. A method of forming a large plurality of individual high resolution micro-images on a photographic film transparency comprising the steps of: forming a first light beam of predetermined frequencies, directing said beam onto a reversible high resolution photo-sensitive material which becomes light absorbing upon exposure to said beam of predetermined frequencies without requiring the forming of a latent image, sequentially introducing individual objects one at a time into the path of said beam, reducing and directing an image of each object introduced into said beam so as to form micro-images at discrete different locations on said photo-sensitive material, forming a second light beam of predetermined frequencies for interaction with said photo-sensitive material and chosen so that the micro-images thereon will be substantially unaffected thereby, and transferring the micro-images formed on said photo-sensitive material onto the photographic film by interacting said second light beam therewith.

16. The method of claim 15 wherein, prior to the step of transferring the micro-images formed on said photo-sensitive material onto said photographic film, the method includes the steps of inspecting said micro-images on said photo-sensitive material and quenching selected ones of said micro-images with said second light beam having a relatively higher intensity than that provided for transferring the micro-images onto said film.

References Cited by the Examiner

UNITED STATES PATENTS

| | | | |
|---|---|---|---|
| 2,186,942 | 1/40 | Vierling | 88—106 |
| 2,835,167 | 5/58 | Pierce | 88—39 |
| 2,859,659 | 11/58 | Fenske et al. | 88—26 |
| 2,953,454 | 9/60 | Berman | 88—1 |
| 2,988,978 | 6/61 | Craig | 88—24 |

NORTON ANSHER, *Primary Examiner.*

EMIL G. ANDERSON, *Examiner.*

UNITED STATES PATENT OFFICE
CERTIFICATE OF CORRECTION

Patent No. 3,185,026 May 25, 1965

Carl O. Carlson et al.

It is hereby certified that error appears in the above numbered patent requiring correction and that the said Letters Patent should read as corrected below.

Column 2, line 52, for "or" read -- on --; column 3, line 23, for "metrachromatic" read -- metachromatic --; column 5, line 32, for "variouns" read -- various --; line 39, for "towad" read -- toward --; column 8, lines 40 and 41, for "displaced" read -- displayed --; column 9, lines 6 and 7, for "storage micro-image" read -- micro-image storage --.

Signed and sealed this 7th day of December 1965.

(SEAL)
Attest:

ERNEST W. SWIDER
Attesting Officer

EDWARD J. BRENNER
Commissioner of Patents